(12) United States Patent
Ida et al.

(10) Patent No.: US 11,491,550 B2
(45) Date of Patent: Nov. 8, 2022

(54) CUTTING INSERT AND TURNING TOOL USING CUTTING INSERT

(71) Applicant: TUNGALOY CORPORATION, Fukushima (JP)

(72) Inventors: Takehiro Ida, Fukushima (JP); Jun Otsuka, Fukushima (JP)

(73) Assignee: TUNGALOY CORPORATION, Fukushima (JP)

( * ) Notice: Subject to any disclaimer, the term of this patent is extended or adjusted under 35 U.S.C. 154(b) by 43 days.

(21) Appl. No.: 17/142,379

(22) Filed: Jan. 6, 2021

(65) Prior Publication Data

US 2021/0213540 A1 Jul. 15, 2021

(30) Foreign Application Priority Data

Jan. 15, 2020 (JP) .............................. JP2020-004700

(51) Int. Cl.
*B23B 27/16* (2006.01)

(52) U.S. Cl.
CPC ..... *B23B 27/1611* (2013.01); *B23B 2200/049* (2013.01); *B23B 2200/086* (2013.01); *B23B 2200/165* (2013.01)

(58) Field of Classification Search
CPC ........ B23B 2200/049; B23B 2200/165; B23B 2205/16; B23B 27/065; B23B 27/1611; B23B 27/1614; B23B 2200/086; B23B 27/141; B23B 27/145; B23B 27/1622; B23B 27/1651

See application file for complete search history.

(56) References Cited

U.S. PATENT DOCUMENTS

| | | | |
|---|---|---|---|
| 3,629,919 A | 12/1971 | Trevarrow | |
| 4,556,345 A * | 12/1985 | Philippi | B23B 27/1644 407/114 |
| 4,674,924 A * | 6/1987 | Carlsson | B23B 27/065 470/80 |
| 5,032,050 A * | 7/1991 | Niebauer | B23B 27/045 407/117 |

(Continued)

FOREIGN PATENT DOCUMENTS

| | | |
|---|---|---|
| CN | 103418823 A | 12/2013 |
| JP | H04-300114 A | 10/1992 |

(Continued)

*Primary Examiner* — Sara Addisu
(74) *Attorney, Agent, or Firm* — Studebaker & Brackett PC

(57) ABSTRACT

A cutting insert 2 includes an upper surface 6, a lower surface 7 on a side opposite to the upper surface 6, and a peripheral side surface 8 connecting the upper surface 6 and the lower surface 7. A cutting edge 61 is formed in at least a part of a first ridgeline 60 where the upper surface 6 and the peripheral side surface 8 intersect. At least one bottomed recess 10 recessed from the lower surface 7 to the upper surface 6 is formed in an outer peripheral portion of the lower surface 7. Each of the recesses 10 is formed in a substantially triangular shape having a first vertex P, a second vertex Q, and a third vertex R. The first vertex P and the second vertex Q are respectively positioned on a second ridgeline 70 where the lower surface 7 and the peripheral side surface 8 intersect. The third vertex R is positioned on the lower surface 7 and separated from the second ridgeline 70.

4 Claims, 10 Drawing Sheets

(56) References Cited

U.S. PATENT DOCUMENTS

| | | | | |
|---|---|---|---|---|
| 5,810,518 | A * | 9/1998 | Wiman | B23B 27/065 407/102 |
| 6,213,691 | B1 * | 4/2001 | Leeb | B23B 51/00 407/34 |
| 6,695,550 | B2 * | 2/2004 | Dunklau | B23B 27/1651 407/116 |
| 9,421,614 | B2 * | 8/2016 | Morgulis | B23B 27/065 |
| 11,185,931 | B2 * | 11/2021 | Andoh | B23B 27/22 |
| 2004/0265074 | A1 | 12/2004 | Hessman et al. | |
| 2009/0162154 | A1 * | 6/2009 | Jonsson | B23B 29/043 407/113 |
| 2009/0252565 | A1 * | 10/2009 | Morgulis | B23B 27/1622 76/101.1 |

FOREIGN PATENT DOCUMENTS

| | | |
|---|---|---|
| JP | 2001-507287 A | 6/2001 |
| WO | 1995-007159 A1 | 3/1995 |
| WO | 98/30349 A1 | 7/1998 |

* cited by examiner

CUTTING INSERT AND TURNING TOOL USING CUTTING INSERT

CROSS-REFERENCES TO RELATED APPLICATIONS

This application relates to and claims priority from Japanese Patent Application No. 2020-004700 on (Jan. 15, 2020), the entire disclosure of which is incorporated herein by reference.

BACKGROUND OF THE INVENTION

Field of the Invention

The present invention relates to a cutting insert and a turning tool using the cutting insert.

Description of Related Art

A turning tool includes an indexable cutting insert and a tool main body for fixing the cutting insert. In the turning tool suitable for thread cutting, grooving, or the like, a wedge-shaped thin-walled portion may be formed in the tip portion of the tool main body (see, for example, FIG. 6 of WO1995/007159). In the following description, such a wedge-shaped thin-walled portion will be referred to as a back metal. The back metal is positioned between an insert seat where the cutting insert is mounted and the tip surface of the tool main body. The back metal fixes the cutting insert together with another wall surface or abuts against the side surface of the cutting insert to prevent the cutting insert from rotating.

SUMMARY

In this regard, an object of the invention is to provide a turning tool and a cutting insert capable of lengthening the life of a tool main body and stably fixable to the tool main body.

A cutting insert according to one aspect of the invention includes an upper surface, a lower surface on a side opposite to the upper surface, and a peripheral side surface connecting the upper surface and the lower surface. A cutting edge is formed in at least a part of a first ridgeline where the upper surface and the peripheral side surface intersect. At least one bottomed recess recessed from the lower surface to the upper surface is formed in an outer peripheral surface of the lower surface. Each of the recesses is formed in a substantially triangular shape having a first vertex, a second vertex, and a third vertex. The first vertex and the second vertex are respectively positioned on a second ridgeline where the lower surface and the peripheral side surface intersect. The third vertex is positioned on the lower surface and separated from the second ridgeline.

A turning tool according to one aspect of the invention includes a tool main body formed in a rod shape extending from a base end to a tip in addition to the cutting insert described above. A insert seat where the cutting insert is mountable is provided near the tip of the tool main body. The insert seat has a first wall surface facing the peripheral side surface of the cutting insert from the tip side. The tool main body has a back metal formed between the first wall surface and an end surface on the tip side. A protrusion protruding from the first wall surface and having a shape resembling the recess is formed on the back metal supporting the cutting insert.

According to these aspects, the wall thickness of the back metal can be increased as the back metal is provided with the protrusion having a shape that resembles the recess. The protrusion of the back metal comes into surface contact with the cutting insert instead of the tip of the back metal coming into point contact with the cutting insert, and thus the load during cutting can be dispersed. By suppressing the deformation of the back metal, it is possible to provide a turning tool and a cutting insert capable of lengthening the life of the tool main body and stably fixable to the tool main body.

In the aspect described above, the second ridgeline may be formed in a substantially equilateral triangle having a first side, a second side, and a third side. The single recess may be formed on each of the first side, the second side, and the third side.

A substantially equilateral triangular cutting insert is economical because three corners can be used by 120 degrees rotation. On the other hand, in the substantially equilateral triangular cutting insert, the insert seat has a substantially equilateral triangle, and thus the back metal is likely to be thin. According to this aspect, it is possible to ensure the wall thickness of the back metal by providing the protrusion having a shape that resembles the recess even when the cutting insert has a substantially equilateral triangle In the aspect described above, the recess 10 may include a long surface formed between the first vertex and the third vertex and a short surface formed between the second vertex and the third vertex. When the short surface is shorter than the long surface, an edge of the recess where the lower surface and the long surface of the recess formed on the first side intersect and that is a part near the first vertex may be formed in a straight line substantially orthogonal to the second side or the third side.

When the cutting insert is mounted on the tool main body by means of a clamp member, the cutting insert is pressed in a direction substantially orthogonal to the second or third side of the cutting insert. The protrusion is guided in the recess along the long surface of the recess. According to this aspect, the direction in which the cutting insert is pressed and the direction in which the protrusion is guided are parallel, and thus the cutting insert can be smoothly restrained.

In the aspect described above, the insert seat further has a seat surface facing the lower surface of the cutting insert. It is preferable that at least a part of the protrusion is inclined toward the first wall surface and away from the seat surface.

According to this aspect, the inclined surface provided in the upper portion of the protrusion comes into sliding contact substantially in parallel to the cutting insert. The inclined surface is capable of coming into surface contact with the cutting insert by slight elastic deformation.

Advantageous Effects of the Invention

According to the invention, it is possible to provide the turning tool and the cutting insert capable of lengthening the life of the tool main body and stably fixable to the tool main body.

DETAILED DESCRIPTION

Figure 1:
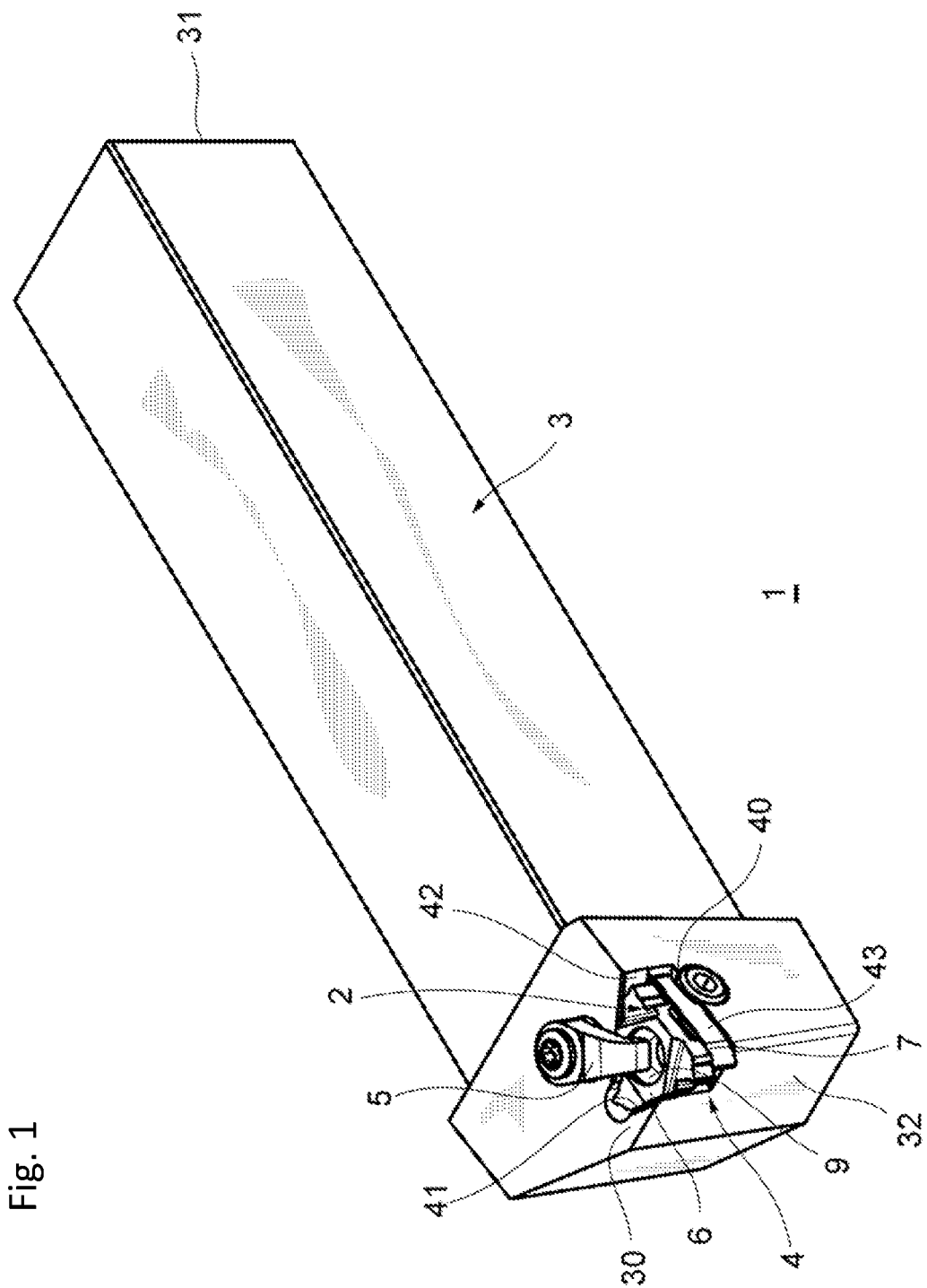
FIG. 1 is a perspective view illustrating an example of the turning tool according to an embodiment of the invention.

A preferred embodiment of the invention will be described with reference to the accompanying drawings. It should be noted that those having the same reference numerals in the drawings have the same or similar configurations. A cutting insert 2 according to the embodiment of the invention has a bottomed recess 10 recessed from an upper surface 6 toward an lower surface 7 (see FIG. 2). The wall thickness of a back metal 30 can be increased as a protrusion 20 corresponding to the recess 10 is provided (see FIG. 7). The recess 10 is formed in a substantially triangular shape having first to third vertices P, Q, and R (see FIG. 4) and fits with the protrusion 20 (see FIG. 8). The protrusion 20 comes into surface contact with the recess 10 after slight elastic deformation (see FIG. 9), and thus the load during cutting (see FIG. 10) can be dispersed.

Figure 4:
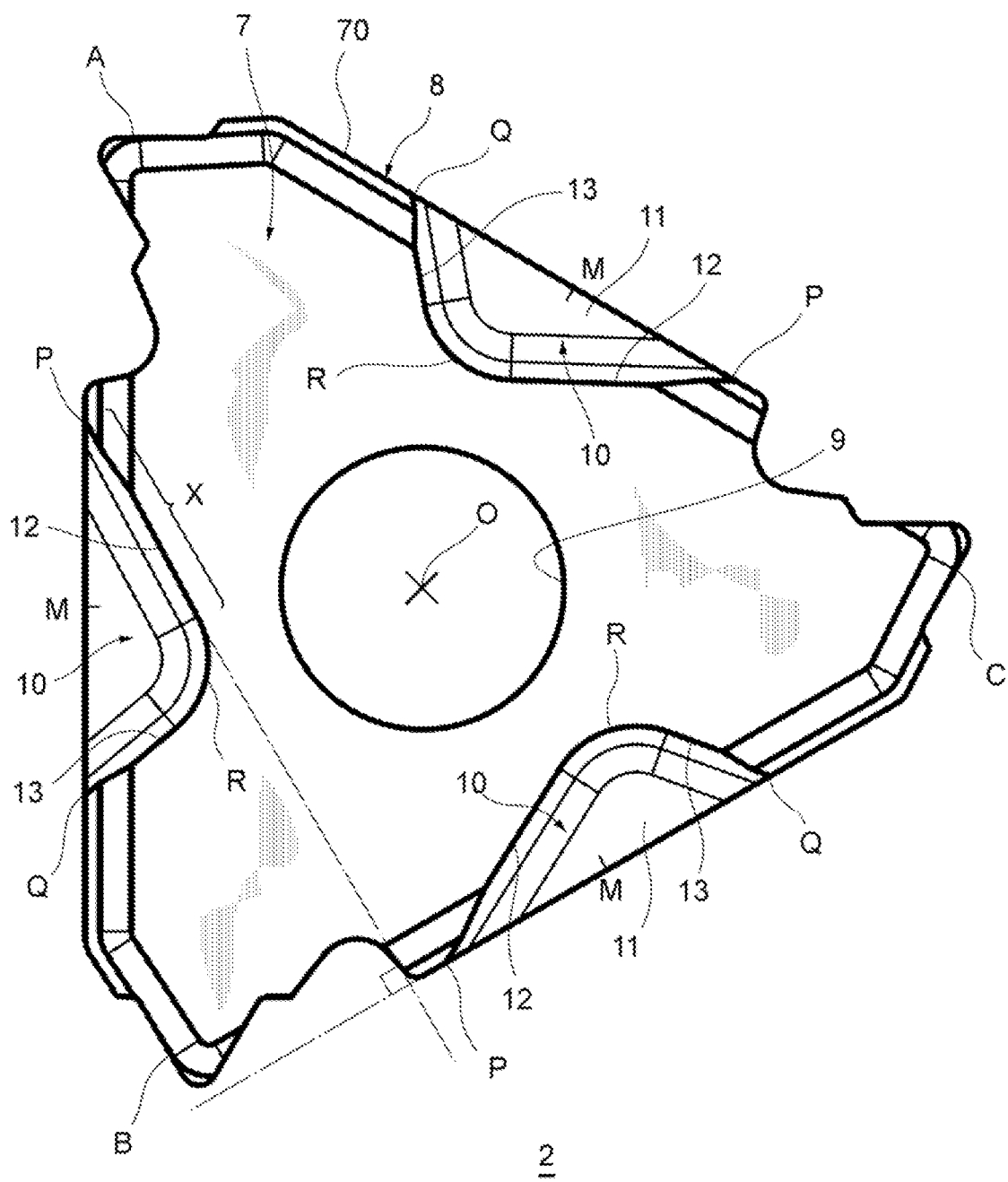
FIG. 4 is a bottom view illustrating the lower surface of the cutting insert illustrated in FIG. 2.
Figure 5:
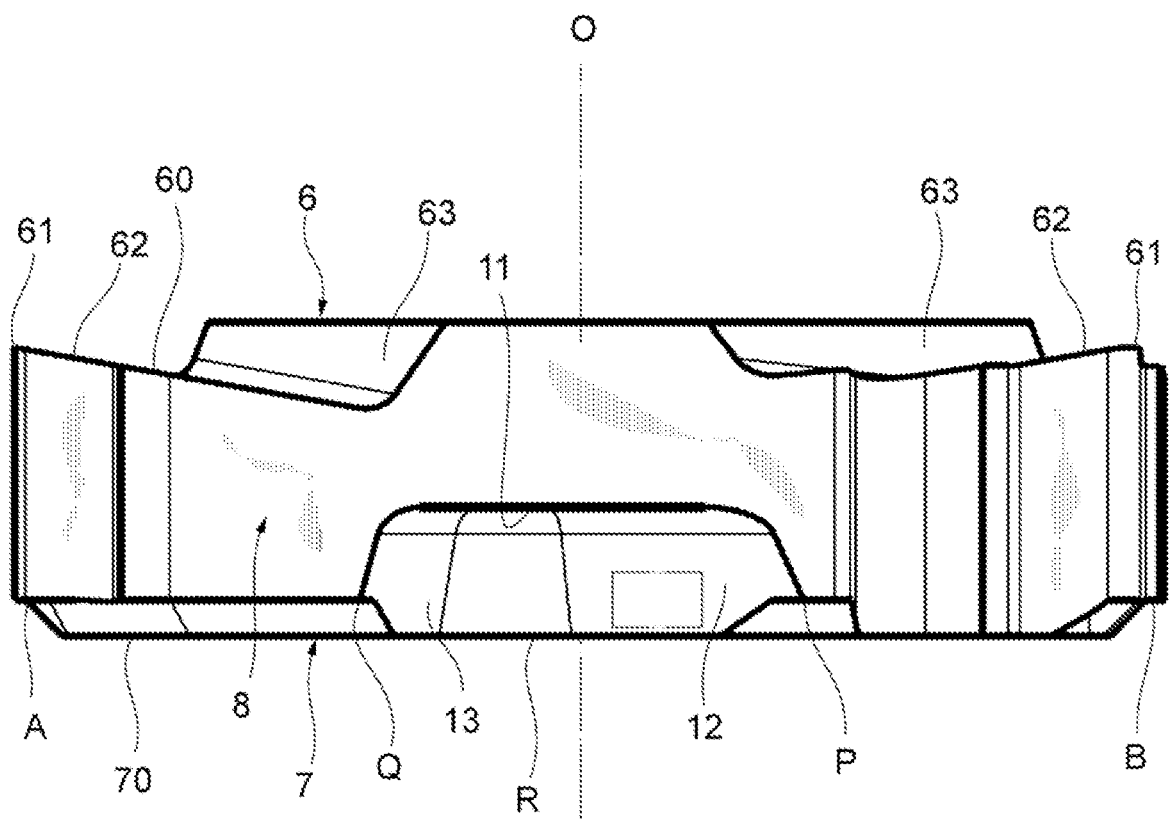
FIG. 5 is a side view illustrating a first side surface of the cutting insert illustrated in FIG. 2.
Figure 6:
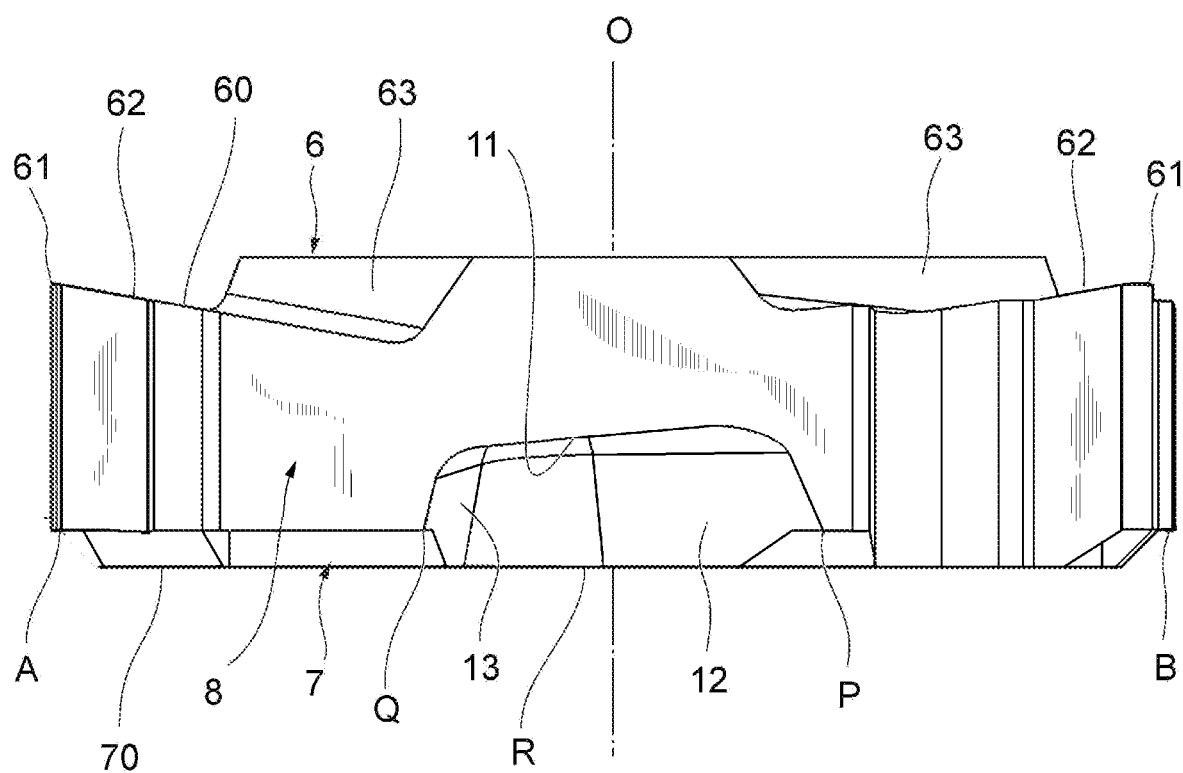
FIG. 6 is a side view illustrating a modification example of the recess illustrated in FIG. 5.

The recess 10 is a bottomed hole that is formed in the lower surface 7 and does not penetrate the upper surface 6 (see FIGS. 5 and 6). When the recess 10 is provided, the space between the recess 10 and a through hole 9 formed at the center of the cutting insert 2 is likely to be thin. In the present embodiment, wall thickness is ensured between a bottom surface 11 of the recess 10 and the upper surface 6, and thus the rigidity of the cutting insert 2 can be ensured on the upper surface 6 where a cutting edge 61 is formed (see FIG. 3). Hereinafter, each configuration will be described in detail with reference to FIGS. 1 to 10.

FIG. 1 is a perspective view illustrating an example of a turning tool 1 according to the embodiment of the invention. As illustrated in FIG. 1, the turning tool 1 includes the indexable cutting insert 2 and a tool main body 3 for fixing the cutting insert 2. The tool main body 3 is formed in a rod shape extending from the base end to the tip. The shank that includes an end surface 31 on the base end side of the tool main body 3 is fixed to, for example, a lathe tool rest. A insert seat 4 where the cutting insert 2 can be mounted is provided near the tip of the tool main body 3.

The insert seat 4 has a seat surface 40 facing the lower surface 7 of the cutting insert 2 and a first wall surface 41 and a second wall surface 42 erected from the seat surface 40. The wedge-shaped back metal 30 is provided between the first wall surface 41 of the insert seat 4 and an end surface 32 on the tip side of the tool main body 3. The back metal 30 supports the cutting insert 2, fixes the cutting insert 2, and prevents the cutting insert 2 from rotating. The shape of the back metal 30 will be described in detail later with reference to FIGS. 7 to 9.

In the illustrated example, an indexable shim 43 is disposed between the lower surface 7 and the seat surface 40.

Most of the tool main body 3 including the insert seat 4 is formed of, for example, steel. The shim 43 is formed of, for example, cemented carbide and is less likely to be deformed than other parts formed of steel. When the shim 43 is interposed between the lower surface 7 and the seat surface 40, the damage-prone part is configured to be indexable and is unlikely to be deformed. Accordingly, the life of the tool main body 3 can be lengthened.

In the illustrated example, the cutting insert 2 is mounted in a clamp-on manner in which the upper surface 6 of the cutting insert 2 is pressed by a clamp member 5. It should be noted that the tool main body 3 is not limited to the clamp-on type. The cutting insert 2 may be mounted in, for example, a screw-on manner in which the upper surface 6 of the cutting insert 2 is pressed by a screw head or may be of a lever lock type in which any one of corners A, B, and C of the cutting insert 2 is pushed into and tightened to the corner of the insert seat 4.

Figure 2:
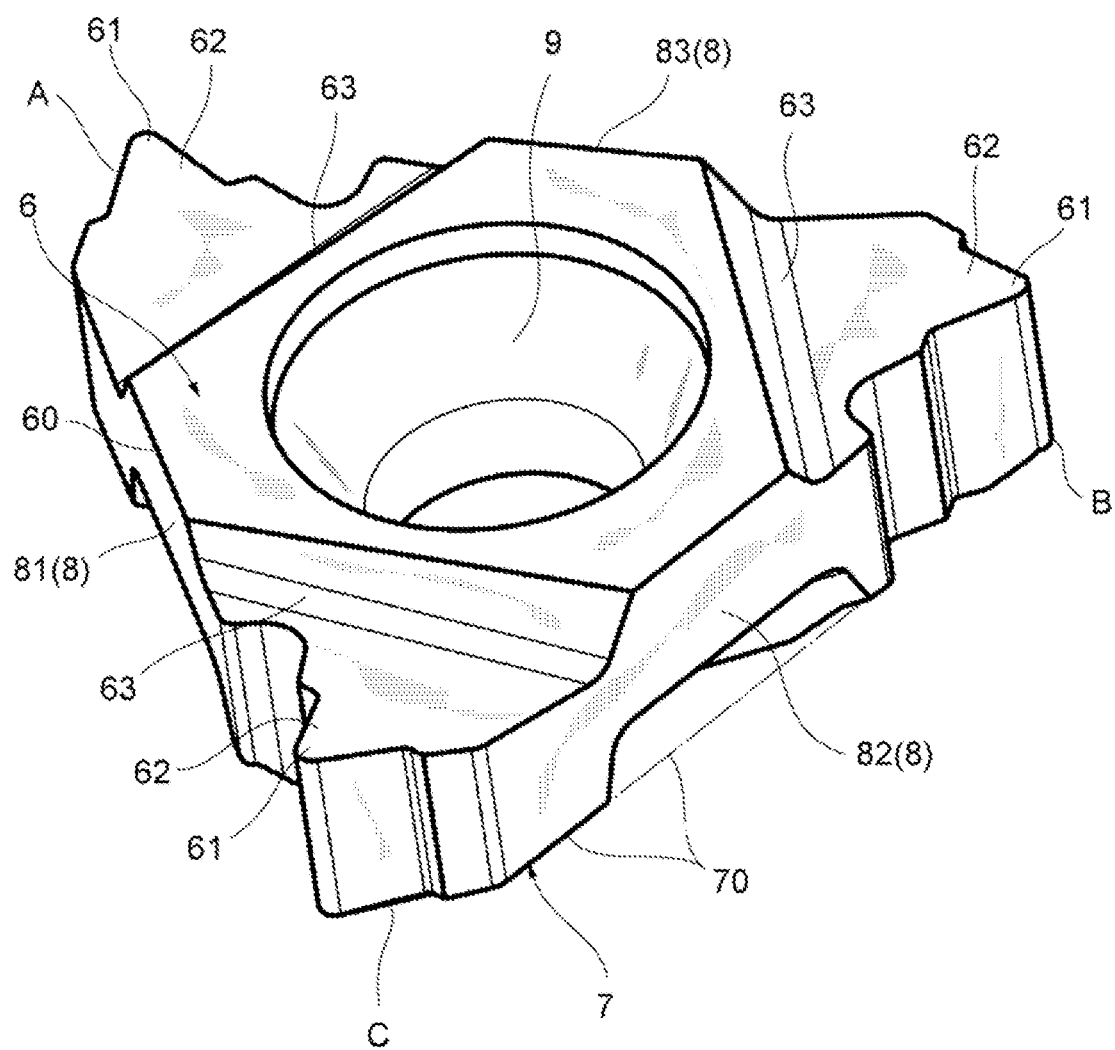
FIG. 2 is a perspective view illustrating an example of the cutting insert illustrated in FIG. 1.

FIG. 2 is a perspective view illustrating an example of the cutting insert 2 illustrated in FIG. 1. In the present embodiment, the material of the cutting insert 2 is not particularly limited. Various cutting insert materials such as cemented carbide can be applied. As illustrated in FIG. 2, the cutting insert 2 has the upper surface 6, the lower surface 7 on the side that is opposite to the upper surface 6, and a peripheral side surface 8 connecting the upper surface 6 and the lower surface 7. The through hole 9 penetrating the upper surface 6 and the lower surface 7 is formed in the cutting insert 2.

The upper surface 6 and the lower surface 7 are formed rotationally symmetric with respect to the center of the through hole 9 (120 degrees symmetry in the illustrated example). In the following description, a central axis O of the cutting insert 2 is a straight line passing through the center of the through hole 9, the side that is close to the central axis O is the central side of the cutting insert 2, and the side that is far from the central axis O is the outer peripheral side of the cutting insert 2.

Figure 3:
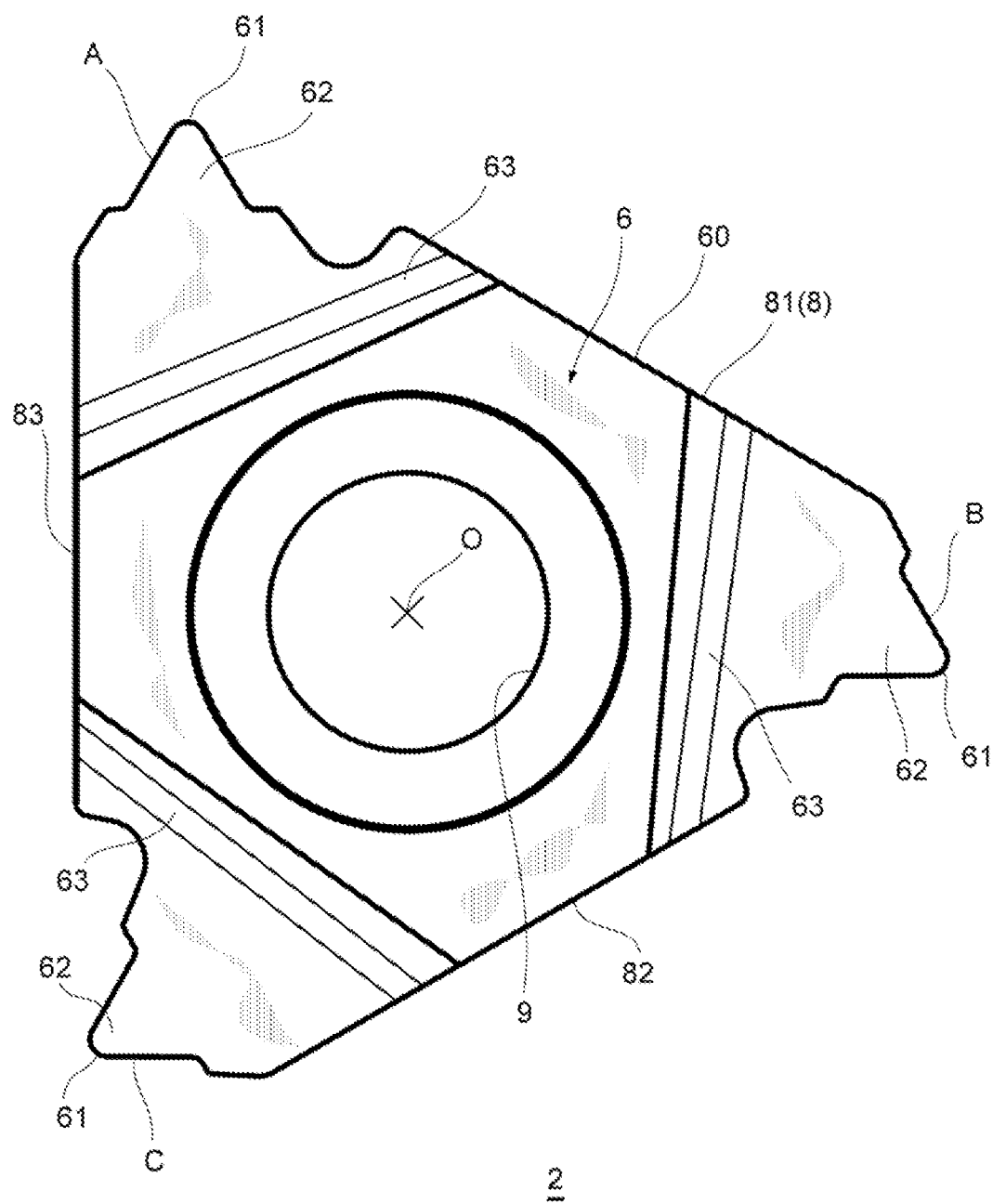
FIG. 3 is a plan view illustrating the upper surface of the cutting insert illustrated in FIG. 2.

FIG. 3 is a plan view illustrating the upper surface 6 of the cutting insert 2 illustrated in FIG. 2. In the illustrated example, a first ridgeline 60, where the upper surface 6 and the peripheral side surface 8 intersect, is formed in a substantially triangular shape. The first ridgeline 60 includes the cutting edge 61 formed at each corner. The upper surface 6 includes a rake surface 62 facing the cutting edge 61 and a chip breaker 63 formed closer to the central side of the cutting insert 2 than the rake surface 62. In the illustrated example, the chip breaker 63 is formed on a curved surface continuous with the rake surface 62.

FIG. 4 is a bottom view illustrating the lower surface 7 of the cutting insert 2 illustrated in FIG. 2. In the illustrated example, a second ridgeline 70, where the lower surface 7 and the peripheral side surface 8 intersect, is formed in a substantially equilateral triangle having the corners A, B, and C. The second ridgeline 70 may be, for example, substantially square without being limited to the substantially equilateral triangle. The cutting insert 2 of the present embodiment has at least one bottomed recess 10 recessed from the lower surface 7 toward the upper surface 6.

As illustrated in FIG. 4, the recess 10 is formed in the outer peripheral portion of the lower surface 7 with first to third sides AB, BC, and CA, which constitute the second ridgeline 70, cut out in part. In the illustrated example, one recess 10 is formed on each of the sides AB, BC, and CA. A side on which the recess 10 is formed and a side on which the recess 10 is not formed may be mixed in the single cutting insert 2.

In the illustrated example, edges PR and QR of the recess 10 formed on the lower surface 7 are formed in a substantially triangular shape having the first to third vertices P, Q, and R. The first and second vertices P and Q are positioned on the second ridgeline 70. The third vertex R is positioned closer to the central side of the cutting insert 2 than the first and second vertices P and Q on the lower surface 7. A side PQ includes a midpoint M of each of the sides AB, BC, and CA.

In the illustrated example, the inner wall surface of the recess 10 is configured by the bottom surface 11, a long surface 12, and a short surface 13. The long surface 12 interconnects the first vertex P and the third vertex R. The short surface 13 interconnects the second vertex Q and the third vertex R. The bottom surface 11 interconnects the long and short surfaces 12 and 13 and the peripheral side surface 8. The edge PR described above is a ridgeline where the long surface 12 and the lower surface 7 intersect, and the edge QR described above is a ridgeline where the short surface 13 and the lower surface 7 intersect. In the illustrated example, the short surface 13 is formed shorter than the long surface 12. A part X is at least half of the edge PR of the recess 10 connecting the first vertex P and the second vertex Q, is near the first vertex, and is formed in a straight line.

The straight line part X of the edge PR of the recess 10 formed on the first side AB extends in a direction substantially orthogonal to the second side BC or the third side CA (second side BC in the illustrated example). Likewise, the straight line part X of the edge PR of the recess 10 formed on the second side BC is substantially orthogonal to the third side CA and the straight line part X of the edge PR of the recess 10 formed on the third side CA is substantially orthogonal to the first side AB. In the recess 10 formed on the first side AB, the first vertex P constituting the long surface 12 is closer to the corner A than the second vertex Q constituting the short surface 13. The second side BC to which the straight line part X of the edge PR of the recess 10 is orthogonal is opposite to the corner A.

The peripheral side surface 8 described above includes a first side surface 81 facing the first side AB of a second ridgeline 70, a second side surface 82 facing the second side BC, and a third side surface 83 facing the third side CA. FIG. 5 is a side view illustrating the first side surface 81 of the cutting insert 2 illustrated in FIG. 2. As illustrated in FIG. 5, the long surface 12 and the short surface 13 are inclined such that the opening of the recess 10 widens toward the lower surface 7. The lower surface 7 is formed substantially flat. In the illustrated example, the bottom surface 11 of the recess 10 is formed parallel to the lower surface 7. In other words, the bottom surface 11 of the recess 10 is formed at a substantially constant depth from the lower surface 7.

FIG. 6 is a side view illustrating a modification example of the recess 10 illustrated in FIG. 5. As illustrated in FIG. 6, the bottom surface 11 of the recess 10 may be inclined with respect to the lower surface 7. In the illustrated example, the bottom surface 11 is formed so as to increase in depth toward the first vertex P.

Figure 7:
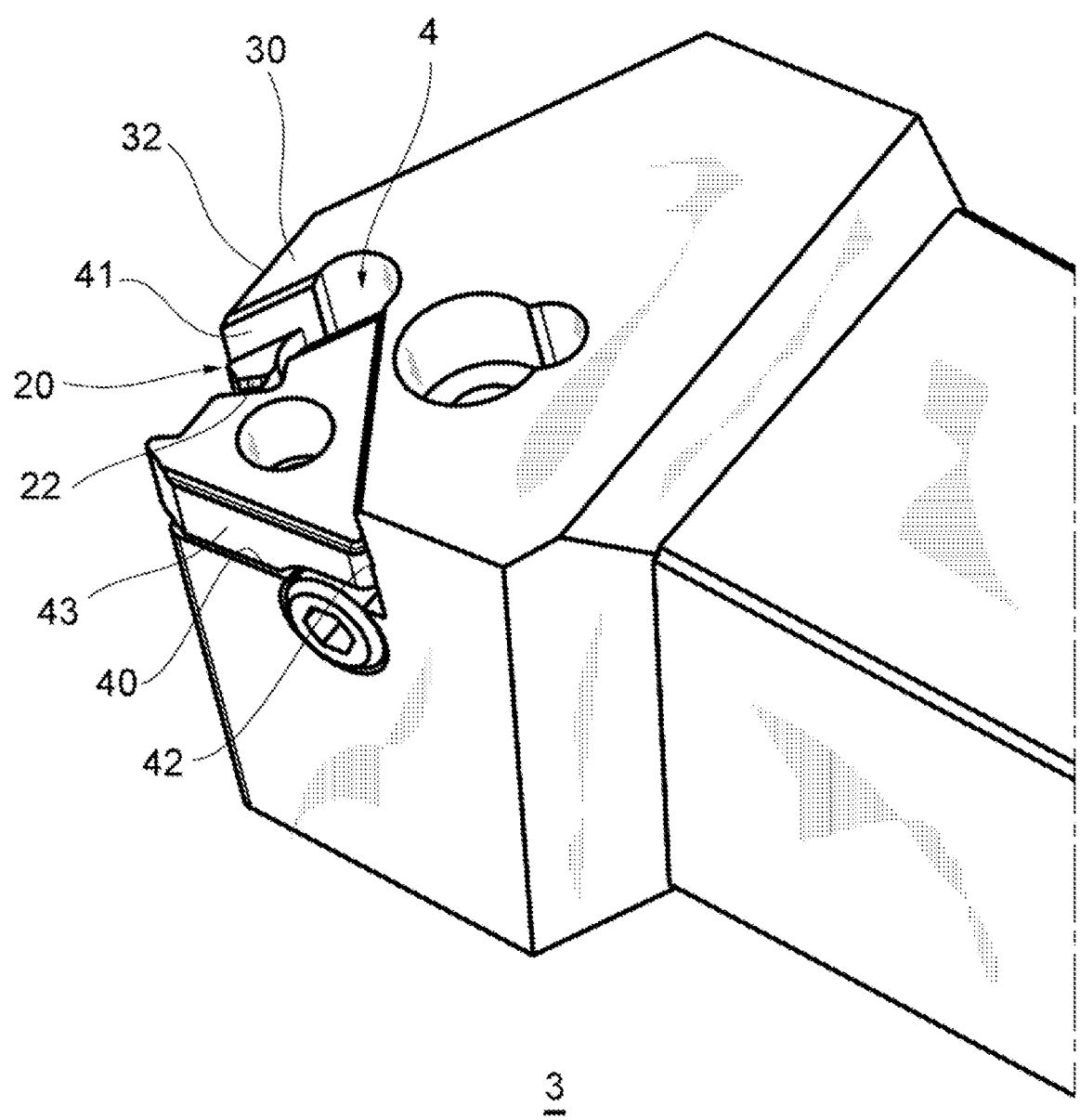
FIG. 7 is a perspective view illustrating a protrusion with the cutting insert removed.

The protrusion 20, which has a shape that resembles the long surface 12 of the recess 10, is formed on the first wall surface 41 of the insert seat 4 described above. FIG. 7 is a perspective view illustrating the protrusion 20 with the cutting insert 2 removed. As illustrated in FIG. 7, the protrusion 20 protrudes from the first wall surface 41 of the insert seat 4 toward the center of the insert seat 4. The side surface of the shim 43 is recessed in a shape that resembles the protrusion 20. In the present embodiment, the wall thickness of the back metal 30 can be increased as the back metal 30 is provided with the protrusion 20 having a shape that resembles the recess 10. At the height of the insert seat 4 from the seat surface 40, the protrusion 20 is formed lower than the back metal 30. The upper portion of the protrusion 20 is close to the seat surface 40, and thus the upper portion of the protrusion 20 is less likely to be deformed than the upper portion of the back metal 30.

Figure 8:
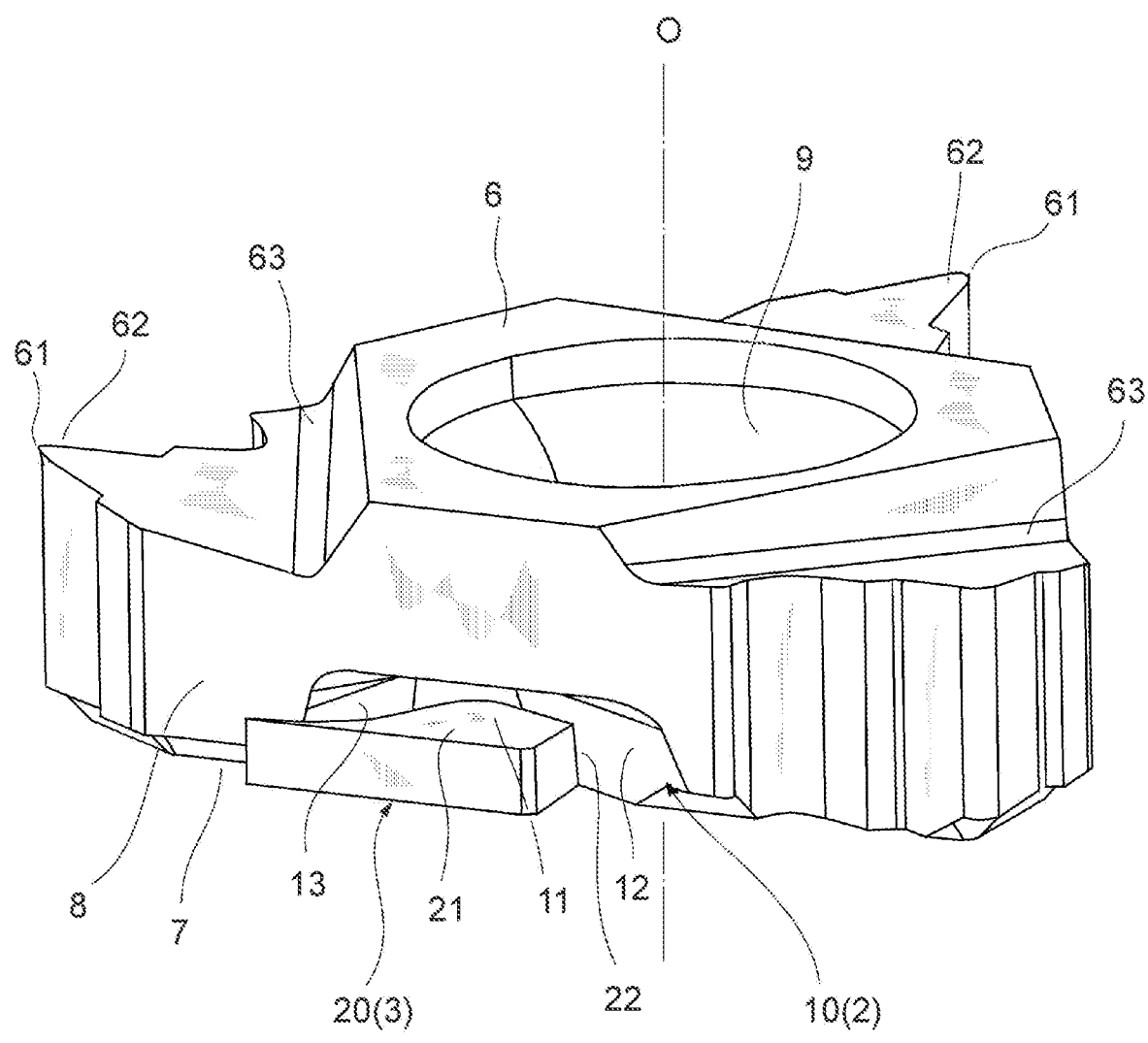
FIG. 8 is a perspective view illustrating a state where the protrusion abuts against the recess.

FIG. 8 is a perspective view illustrating a state where the protrusion 20 abuts against the recess 10. As illustrated in FIG. 8, a top surface 21 of the protrusion 20 and the bottom surface 11 of the recess 10 face each other with a gap in a state where the cutting insert 2 is mounted on the tool main body 3. The tip portion of the protrusion 20 abuts against the inner wall surface of the recess 10. When the protrusion 20 abuts against the inner wall surface of the recess 10, the protrusion 20 is slightly deformed elastically and comes into surface contact with the inner wall surface of the recess 10. The two-dot chain line in FIG. 5 indicates an example of the region where the protrusion 20 and the recess 10 are in surface contact with each other.

Figure 9:
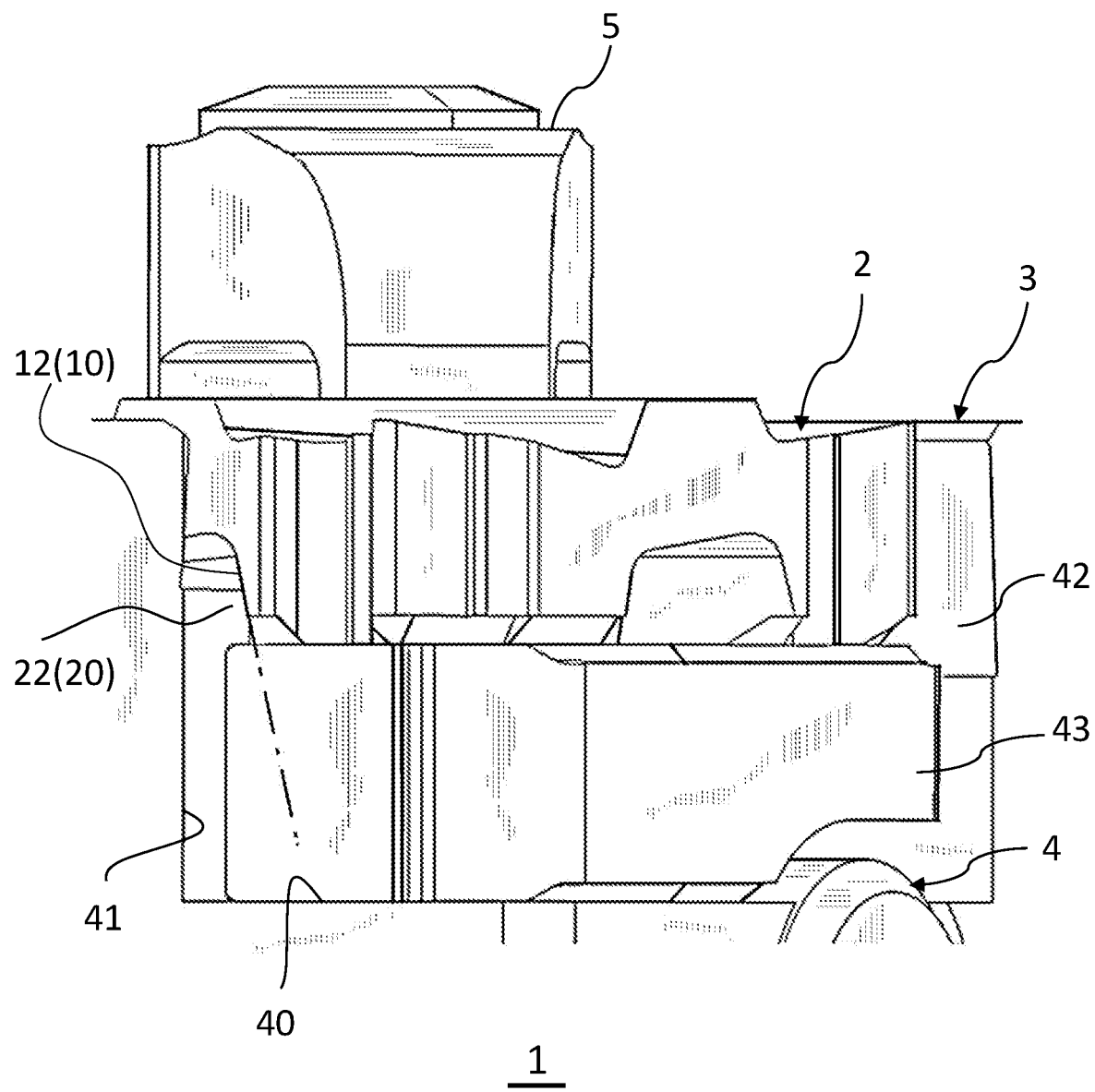
FIG. 9 is a side view illustrating a state where the inclined surface of the protrusion abuts against the recess.

FIG. 9 is a side view illustrating a state where an inclined surface 22 of the protrusion 20 abuts against the recess 10. As illustrated in FIG. 9, the protrusion 20 includes the inclined surface 22 inclined toward the first wall surface 41 and away from the seat surface 40 of the insert seat 4. The inclined surface 22 is disposed in the upper portion of the protrusion 20 and formed substantially parallel to the inner wall surface of the recess 10 (for example, the long surface 12). When the cutting insert 2 is attached to the insert seat 4, the inclined surface 22 comes into sliding contact with the recess 10 and the protrusion 20 is slightly deformed elastically.

According to the cutting insert 2 of the present embodiment configured as described above and the turning tool 1 provided with the cutting insert 2, the wall thickness of the back metal 30 can be increased by the protrusion 20 protruding from the first wall surface 41 of the insert seat 4 as illustrated in FIGS. 7 to 9. Moreover, the position of the part where the back metal 30 supports the peripheral side surface 8 of the cutting insert 2 can be shifted to the thick protrusion 20 from the tip of the back metal 30 with the minimum thickness.

The point contact of the insert changes to the surface contact of the protrusion 20, and thus the load on the back metal 30 can be dispersed. Moreover, the protrusion 20 is not only thick but also shorter and less likely to be deformed than the tip of the back metal 30. Accordingly, the deformation of the back metal 30 can be suppressed and the life of the tool main body 3 can be lengthened. The cutting insert 2 can be stably fixed to the tool main body 3, and the positioning accuracy of the cutting edge can be improved.

Figure 10:
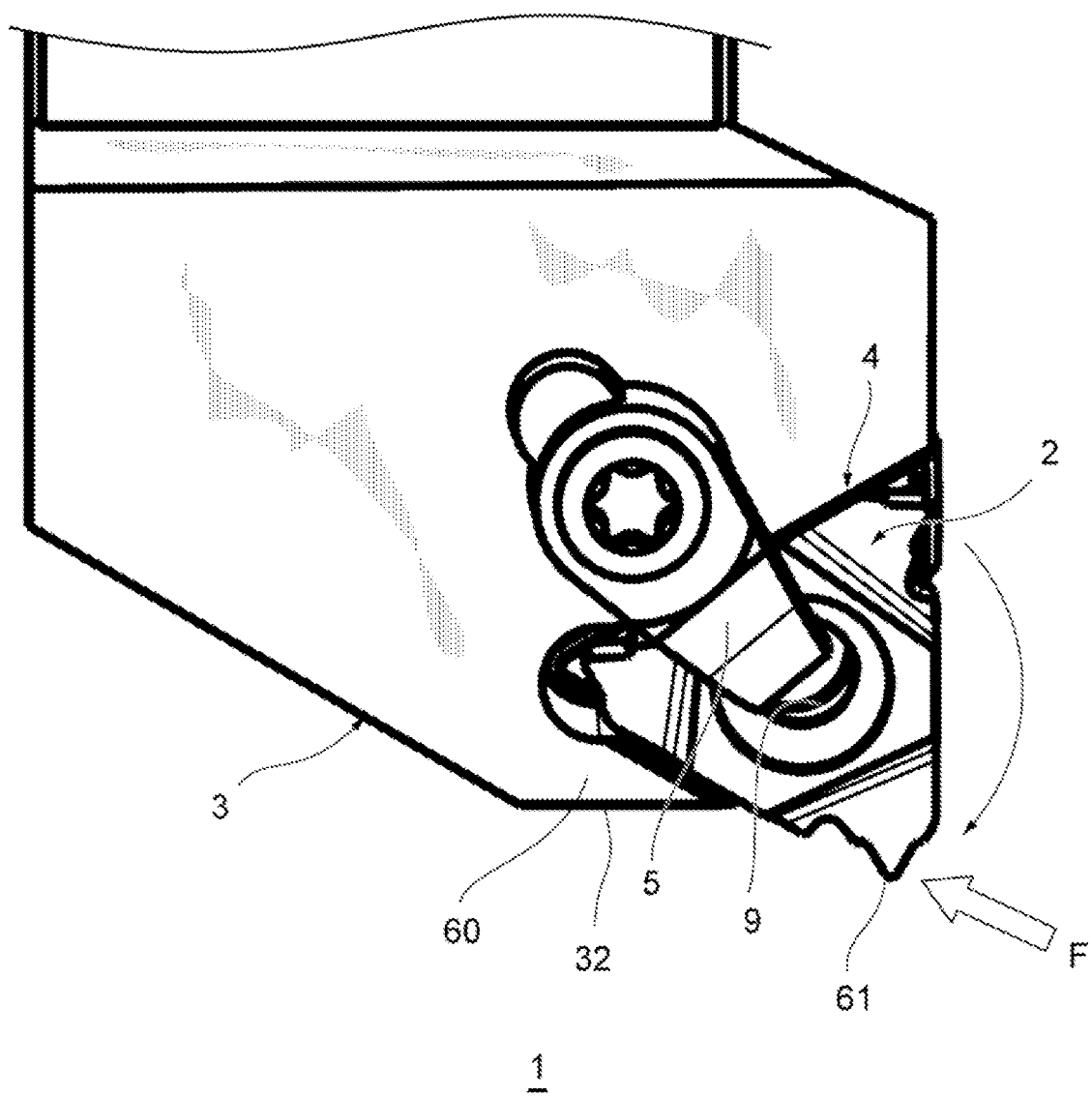
FIG. 10 is a plan view illustrating a load acting on a back metal.

FIG. 10 is a plan view illustrating a load acting on the back metal 30. During cutting, a force F acts so as to rotate the cutting insert 2 about the through hole 9 fixed to the clamp member 5 and the back metal 30 that prevents the cutting insert 2 from rotating is burdened. As illustrated in FIG. 10, the load on the back metal 30 is particularly large during cutting in which the force F acts only on one side of the cutting edge 61 (flank in-feed).

In the cutting insert of the related art that lacks the recess 10, the life of the tool main body 3 tends to be short in the flank in-feed illustrated in FIG. 10. The cutting insert 2 of the present embodiment is significantly different from the cutting insert of the related art particularly in the flank in-feed, which is a strict condition for the tool main body 3, and is capable of significantly lengthening the life of the tool main body 3.

In the present embodiment, the recess 10 is a bottomed hole that does not penetrate the upper surface 6. Accordingly, as illustrated in FIGS. 5 and 6, wall thickness can be ensured between the bottom surface 11 of the recess 10 and the upper surface 6. The rigidity of the cutting insert 2 can be ensured on the upper surface 6 where the cutting edge 61 is formed. As illustrated in FIG. 9, the upper portion of the protrusion 20 is the inclined surface 22 substantially parallel to the recess 10. Accordingly, a large contact area can be ensured between the protrusion 20 and the recess 10 when the protrusion 20 is elastically deformed.

The embodiment described above is to facilitate the understanding of the invention and is not to limit the interpretation of the invention. Each element included in the embodiment and the disposition, material, condition, shape, size, and so on thereof can be appropriately changed without being limited to the above exemplification. In addition, configurations illustrated in different embodiments can be partially replaced or combined.

The embodiment described above is to facilitate the understanding of the invention and is not to limit the interpretation of the invention. Each element included in the embodiment and the disposition, material, condition, shape, size, and so on thereof can be appropriately changed without being limited to the above exemplification. In addition, configurations illustrated in different embodiments can be partially replaced or combined.

REFERENCE SIGNS LIST

1 Turning tool
2 Cutting insert
3 Tool main body
4 Insert seat
5 Clamp member
6 Upper surface
7 Lower surface
8 Peripheral side surface
9 Through hole
10 Recess
11 Bottom surface
12 Long surface
13 Short surface
20 Protrusion
21 Top surface
22 Inclined surface
30 Back metal
31 Base end surface
32 Tip surface
40 Seat surface
41 First wall surface
42 Second wall surface
43 Shim
60 First ridgeline
61 Cutting edge
62 Rake surface
63 Chip breaker
70 Second ridgeline
81 First side surface
82 Second side surface
83 Third side surface
A, B, C Corner
AB First side
BC Second side
CA Third side
F Force acting during cutting
O Central axis
P First vertex
Q Second vertex
R Third vertex
PR, RQ Edge
X Straight line part

What is claimed is:

1. A cutting insert comprising:
an upper surface;
a lower surface on a side opposite to the upper surface; and
a peripheral side surface connecting the upper surface and the lower surface, a cutting edge being formed in at least a part of a first ridgeline where the upper surface and the peripheral side surface intersect, wherein
at least one bottomed recess recessed from the lower surface to the upper surface is formed in an outer peripheral portion of the lower surface, and
each of the recesses is formed in a substantially triangular shape having a first vertex and a second vertex respectively positioned on a second ridgeline where the lower surface and the peripheral side surface intersect and a third vertex positioned on the lower surface and separated from the second ridgeline, wherein
the second ridgeline is formed in a substantially equilateral triangle having a first side, a second side, and a third side,
the single bottomed recess is formed on each of the first side, the second side, and the third side,
the bottomed recess includes a long surface formed between the first vertex and the third vertex and a short surface formed between the second vertex and the third vertex and shorter than the long surface, and
an edge of the bottomed recess where the lower surface and the long surface formed on the first side intersect and that is a part near the first vertex is formed in a straight line substantially orthogonal to the second side or the third side.

2. A turning tool comprising: the cutting insert according to claim 1; and
a tool main body formed in a rod shape extending from a base end to a tip with a insert seat where the cutting insert is mountable provided near the tip,
wherein the insert seat has a first wall surface facing the peripheral side surface of the cutting insert from the tip side,
the tool main body has a back metal formed between the first wall surface and an end surface on the tip side and supports the cutting insert, and
a protrusion protruding from the first wall surface and having a shape resembling the bottomed recess is formed on the back metal.

3. The turning tool according to claim 2, wherein
the insert seat further has a seat surface facing the lower surface of the cutting insert, and
at least an upper part of the protrusion is inclined toward the first wall surface and away from the seat surface.

4. A turning tool comprising a cutting insert and a tool main body, wherein
the cutting insert comprising:
an upper surface;
a lower surface on a side opposite to the upper surface; and
a peripheral side surface connecting the upper surface and the lower surface, a cutting edge being formed in at least a part of a first ridgeline where the upper surface and the peripheral side surface intersect, wherein at least one bottomed recess recessed from the lower surface to the upper surface is formed in an outer peripheral portion of the lower surface, and each of the bottomed recesses is formed in a substantially triangular shape having a first vertex and a second vertex respectively positioned on a second ridgeline where the lower surface and the peripheral side surface intersect and a third vertex positioned on the lower surface and separated from the second ridgeline, the tool main body formed in a rod shape extending from a base end to a tip with an insert seat where the cutting insert is mountable provided near the tip, wherein the insert seat has a first wall surface facing the peripheral side surface of the cutting insert from the tip side, the tool main body has a back metal formed between the first wall surface and an end surface on the tip side and supports the cutting insert, and a protrusion protruding from the first wall surface and having a shape resembling the recess is formed on the back metal, wherein the insert seat further has a seat surface facing the lower surface of the cutting insert, and at least an upper part of the protrusion is inclined toward the first wall surface and away from the seat surface.

* * * * *